INVENTOR.
MARTINUS DEN HERTOG

BY

R P Morris

ATTORNEY

Oct. 7, 1952 M. DEN HERTOG 2,613,277

TELEPHONE SYSTEM

Filed May 8, 1948 2 SHEETS--SHEET 2

INVENTOR.
MARTINUS DEN HERTOG

BY

ATTORNEY

Patented Oct. 7, 1952

2,613,277

UNITED STATES PATENT OFFICE 2,613,277

TELEPHONE SYSTEM

Martinus den Hertog, Antwerp, Belgium, assignor to International Standard Electric Corporation, New York, N. Y., a corporation of Delaware Application May 8, 1948, Serial No. 25,901
In the Netherlands October 5, 1947

6 Claims. (Cl. 179—18)

The invention relates to an automatic or semi-automatic telephone system or similar system for establishing connections in which subscriber's lines or junctions associated with apparatus common to these lines or junctions may be connected to this apparatus.

In systems known hitherto in which a call had to be extended via one of a number of junctions towards an apparatus e. g. a register connected in common to these junctions, by the intermediance of a plurality of selector switches allotted for a group of junctions, it was usual to simultaneously start a plurality of selector switches with arbitrary different starting positions, whereby that selector switch, the wipers of which were nearest to the calling line, could seize this line first. This means therefore that for each line or junction to be seized, more than one selector switch had to be started thus involving an uneconomical use of the number of selector switches available. The wear will be rather considerable whilst moreover due to the simultaneous start of these selector switches not only unnecessary noise will be produced in the switching room but also undesired vibrations will occur in the switch bays which again will have a detrimental influence upon the connections already built up through switches on these bays (unallowable microphonic noise). Circuit arrangements are known for starting only one selector switch to seize the line in question but these circuit arrangements did not take into consideration the necessity that this selector switch should have its wipers as near as possible to the line to be seized so that unnecessarily large waiting times could be avoided.

The present invention is based on the discernment that in a system, in which corresponding parts of the selector switch circuits of a group are included in a closed series circuit and in which the selector switches each have a different home position which for the various selector switches of a group have been distributed at preferably equal spacings along the terminal arcs; at the moment a call on one of the lines or junctions originates, a preferred circuit arrangement is present, whereby that free selector switch of the group under consideration is started, the home position of which is nearest to the terminals of the line in the switching direction.

In accordance with the main feature of the invention, these corresponding parts of the selector switch circuits in the closed series circuit, exclusively include linear and non-linear resistances.

In this manner a very reliable switching operation with very short hunting time is obtained and the possibility is also provided, in the cases coming into consideration, to most economically switch-over from one selector switch circuit onto another selector switch circuit in the chain for seizing the calling line or junction.

In accordance with the invention the series connection of these resistances for each selector switch is bridged by one or more normally open contacts, which are closed when this selector switch circuit is occupied or not available.

In accordance with a further feature of the invention, if a selector switch the home position of which is located nearest to the set of terminals of the calling line or junction, is occupied or not available, via the closed bridging contact, a circuit becomes immediately operative for closing the starting circuit of a next selector switch, the home position of which after the first mentioned finder, is then nearest to the terminals of the calling line or junction.

If this next selector switch or several next selector switches is or are occupied or not available, in accordance with the further feature of invention a similar switching-through via the bridging contact of the second or further selector switch takes place towards that selector switch the home position of which is then located most favourably.

If the starting circuit remains closed longer than a predetermined minimum duration of time e. g. as a consequence of failure of a preferred selector switch; in accordance with the invention, the non-linear resistance in the part of the series circuit, to which such a bias was normally applied that the failure occurred in a non-conducting condition in the direction towards the next preferred finder, is so polarized by a slow discharge of a condenser that current passage takes place after a predetermined delay in the starting circuit of the next selector switch in the series circuit.

Moreover in accordance with a further feature of the invention, the starting circuit is closed in such sense, that the non-linear resistance of the last selector switch in the series circuit prevents a current flow to a starting circuit of a preceding selector switch.

The above-mentioned non-linear resistance may consist of a dry-surface rectifier e. g. a selenium rectifier.

The invention will be described with reference to the accompanying drawings in which Fig. 1 shows a schematic embodiment in which a plurality of junctions are connected, leading to incoming group selectors via selector switches.

Figures 1, 3:
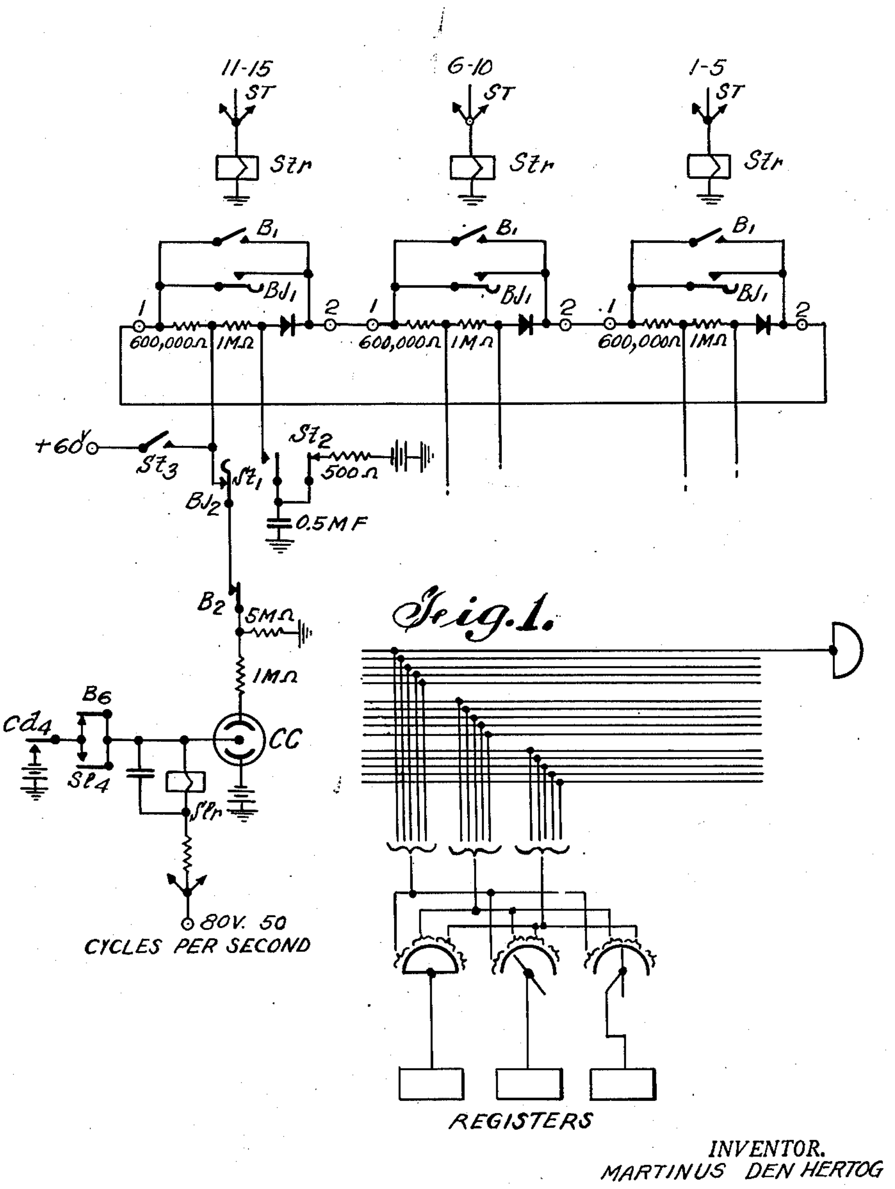
Fig. 3 shows a chain circuit arrangement formed by some successive selector switch circuits.
Figure 2:
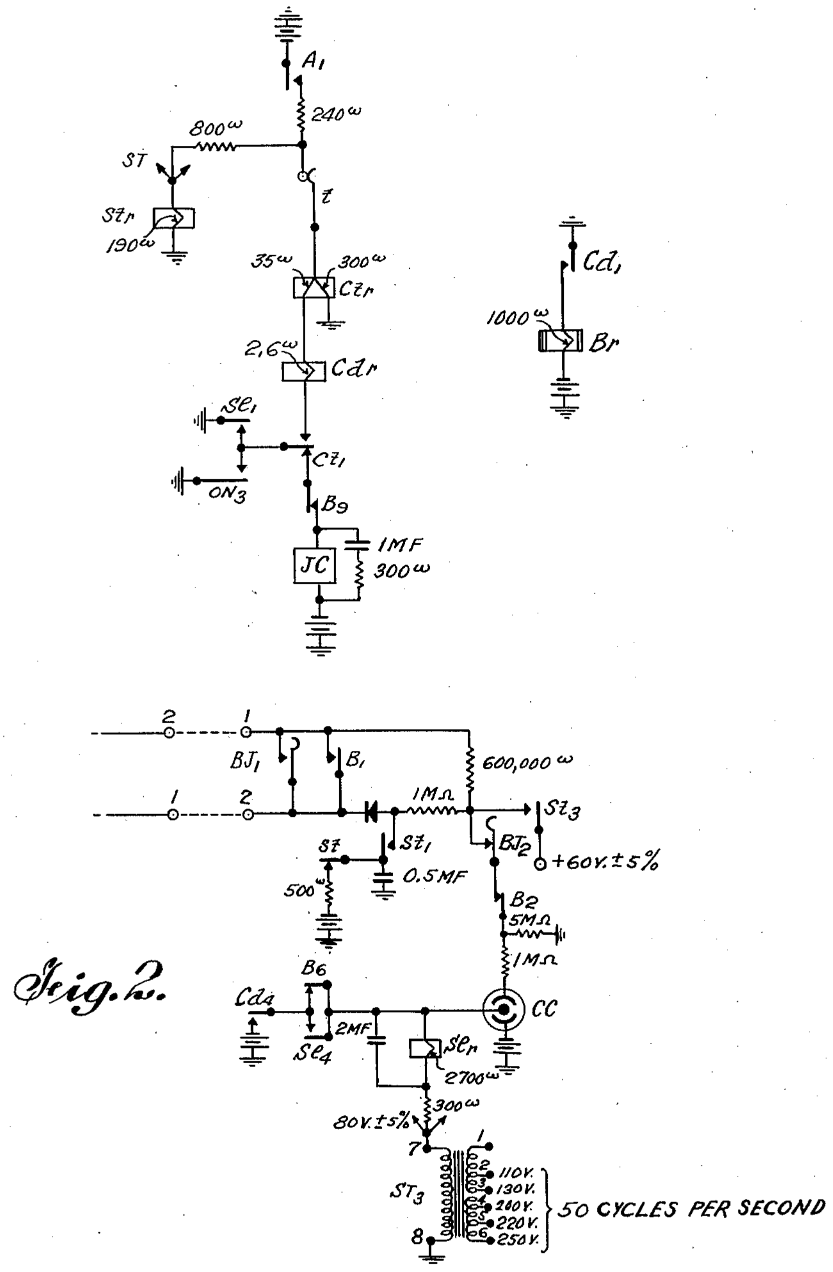
Fig. 2 shows this circuit arrangement more in detail, whilst

Corresponding parts of Figs. 2 and 3 have been indicated by the same reference-numbers.

In the circuit arrangement shown in Fig. 1 it may be assumed by way of example that each selector switch serves 50 junctions and that 10 registers have been provided in common for these 50 junctions. In order to make sure that for each call which seizes a junction circuit, only one selector switch starts to establish the desired connection to a register circuit, the number of junction circuits or the number served by a group of selector switch circuits is subdivided in the most approximate manner into equal sub-groups, allotted to the different register circuits, so that each sub-group and in the present example shown in Fig. 1, 5 junction circuits preferably cooperate with one register. To this end the starting wires ST (Fig. 2) of each sub-group of junctions are connected with the starting relay S*tr* associated with the preferred register.

In order to reduce the hunting time of the selector switch to a minimum, the junction circuits of each sub-group which are preferably served by a register, are connected with successive terminal sets in all selector switch arcs, and measurements are taken, so that a preferred selector switch starts its hunting movement from a home position, corresponding with the first terminals of this sub-group. From this it will be evident, that the selector switches of a group all have different home positions, each home position corresponding with the first terminals of its own preferred junction sub-group and that the number of these home positions is equal to the number of selector switches in the group.

In case a junction circuit requires the connection of a register at a moment that the preferred selector switch in a preceding group is occupied, or is not available for another reason, one of the other selector switch circuits being free at this moment, will be started instead of the first considered selector switch circuit. In order to reduce the hunting time of the junction selector switch to a minimum in this case, preference is given to that free circuit, the home position of its selector switch of which is nearest to the terminals corresponding to the junction under consideration, taken from this terminal set in a direction opposite to the direction of movement of the selector switches.

Furthermore, means are provided to start a second selector switch circuit hunting for a call, in case the first already started circuit, for any reason would fail to hunt the junction within a predetermined time of an average of 0.6 second (e. g. a minimum of 0.4 and a maximum of 0.9 second). The duration of this interval has been chosen so that the first selector switch circuit has an opportunity to hunt the junction in time if this first mentioned circuit functions normally, provided this circuit needs not hunt over more than 24 terminals. This is approximately half the arc circumference, basing on a minimum time of 0.4 second or a hunting speed of 60 terminals per second. As the preferred circuit usually has to hunt over no more than about 5 to 6 terminals and the different home positions of the selector switches are also interspaced by distances corresponding to 5 to 6 terminals, the minimum interval of 0.4 second permits the junction to be found either by the preferred junction selector switch or by one of the 3 or 4 other selector switches having their home positions within a distance of no more than 24 terminals from the calling junction, taken in backward direction if one of these selector switches would be started. In exceptional cases of peak load it may therefore happen that two circuits are started with an interval of average 0.6 second if two selector switches are available and if both have the home positions located at more than 24 terminals from the junction under consideration.

In order to obtain for each call the preferential starting of one circuit in a definite sequence, the various selector switch circuits of a group are included in a closed chain circuit. The circuit arrangement is made such that no relay or other switching contacts are included in this chain circuit, so that the opening of the chain, with the consequent failure of starting alternative circuits, owing to faulty contacts, is effectively rendered impossible. This chain circuit is shown in Fig. 3 for three successive selector switch circuits. For the sake of clearness the left selector switch circuit has been shown in more detail but it will be clear that the same components are also present in the other selector switch circuits of the chain. Each link of the chain comprises the series connection of two resistances and the one rectifier. Shunted to the series connection of these three elements there is provided a normal front contact $B_1$ which is closed if the selector switch circuit has been seized by a junction. This contact $B_1$ is a front contact of relay B*r*, which is operated as long as the selector switch circuit is in use. A second contact $B_2$ arranged as back contact is located in series with the control electrode of a gas filled tube, the function of which will be described later. The functions of both contacts $B_1$ and $B_2$ may be taken over by the contacts of a special break jack BJ provided for each selector switch circuit.

When the junction circuit calls for a register, it connects battery via a front contact $A_1$ (Fig. 2) and a total resistance of 1040 ohms to the starting wire ST of the preferred register circuit so that in this register circuit the starting relay S*tr* will operate. The same battery is through a 240-ohm resistance connected to the test terminal "*t*" of the group of selector switches. If the preferred register circuit is free, the operation of the starting relay S*tr* causes the gas-filled cold cathode tube CC to be ionised since a +60 volt potential is connected via the front contact $St_3$, break jack $BJ_2$ and back contact $B_2$ and 1 megohm variable resistance to the control electrode of the tube CC. Since the potential connected now with the control gap of the tube is above the break down potential, the tube fires and a circuit is closed from negative battery through its main gap, the winding of relay S*lr*, 300 ohm resistance to the 50-cycle supply of the A. C. source. A current will only flow through this circuit during the positive wave halves of the alternating current. The pulsating current produced thereby will operate relay S*lr*, which remains operated during the negative wave halves viz, by the discharge of a condenser which is connected across the winding of this relay. The circuit for the power magnet of the selector switch is now closed via front contact $Sl_1$, which selector switch, if necessary, will leave its home position for hunting the junction in question.

When the test wiper meets the "*t*" terminal, to which the test potential is connected, a test relay C*tr* operates and at its break contact $Ct_1$ opens the circuit for the selector switch circuit JC. If it proves that the junction in question is connected with the home position of the selector switch, relay C*tr* will operate so quickly that the power magnet does not obtain an opportunity of being energised so that this selector switch will not start. Through front contact $Ct_1$, relay C*tr* connects its low resistance winding in shunt with its high resistance winding, so that the test potential will be rendered busy by other hunting selector switches and the starting circuit will be closed, thereby releasing the starting relay *Str*.

Relay *Cdr* which is connected in series with the low resistance winding of relay *Ctr*, operates if no double test takes place, so that the front contact of relay *Ctr* remains definitely closed. Via front contact $Cd_1$ the above-mentioned relay *Br* will operate, closing its front contact $B_1$ and opening its back contact $B_2$ so that on one hand the series circuit in the chain is bridged across $B_1$ whilst via contact $B_2$ the circuit of the tube CC will be opened. Meanwhile relay *Slr* remains energised through its front contact $Sl_4$ and front contact $Cd_4$ to battery. The tube CC now extinguishes. In a manner which for the sake of simplicity has not been shown in the drawings, relay *Br* will cause the through connection of the junction to the register circuit via the remaining wipers of the switch. A consequence hereof is, that in the connecting circuit, the contact $A_1$ will be opened so that battery is opened via test terminal *"t"* and through the relays *Str* and *Cdr*. The relay *Slr* will release as well. Relay *Br* however remains energised in a manner not shown here as long as the circuit remains occupied.

If the register circuit is released relay *Br* releases so that the restoring circuit for the power magnet JC is closed over the off-normal contact $ON_3$ from ground, off-normal contact $ON_3$ back contact $Ct_1$, back contact $B_9$ and to battery through the power magnet JC.

If during restoring the selector switch, a test terminal is met on which test potential is present, the test relays *Ctr* and *Cdr* may operate also without the start relay *Str*, the tube CC or the relay *Slr* being in operative condition. In this case relay *Slr* operates after the operation of *Cdr* from battery via front contact $Cd_4$ back contact $B_6$ winding of *Slr* to 50 cycle supply of 80 volt potential and this relay will then close other contacts, required for the further operation in the circuit which has not further been shown. In this manner it is seen that the restoring time of a selector switch is not lost.

Terminal No. 1 (see Fig. 3) of each selector switch circuit is connected with terminal No. 2 of a preceding selector switch circuit, the series circuit being closed because terminal No. 1 of the first mentioned selector switch circuit is connected with terminal No. 2 of the last selector switch circuit. This series circuit is used to start another selector switch circuit if the preferred circuit is occupied or is not available.

When relay *Str* operates for a call from one of the junctions, with which the relay *Str* in question is connected, at a moment when the junction with the associated selector switch is occupied in connection with another junction or is not available—for example is insulated at this moment—the gas-filled tube CC associated with the selector switch under consideration cannot function, because the circuit for the control electrode is opened at back contact $B_2$ so that relay *Slr* is prevented from energising. In this case the positive potential is connected in the following manner from the front contact $St_3$ to the next selector switch circuit: source of +60 volt, front contact $St_3$, resistance of 600,000 ohms, front contact $B_1$ or a closed contact of the break jack $BJ_1$, terminal No. 2 of the selector switch circuit under consideration, terminal No. 1 of the next selector switch circuit in the chain, resistance of 600,000 ohms, back contact of break jack $BJ_2$, back contact $B_2$, series resistance of 1 megohm to the control electrode of the gas-filled tube CC in the next selector switch circuit of the chain, provided the latter is free and available.

The potential present at the control electrode of the tube in the next selector switch circuit, is sufficient to attain the firing of this tube, so that the corresponding selector switch starts as a consequence of the operation of relay *Slr*.

The selector switch circuit shown as the next circuit in the chain is that in which the home position of the selector switch corresponds with the first terminal of the third group of junctions preceding the sub-group under consideration in which a call originated. The consequence hereof is that the selector switch of the next circuit in the chain needs only to perform a hunting movement over the 5 terminals of its own junctions to reach the sub-group to which the junction belongs over which the calls took place.

If the next circuit or more than one successive circuit in the chain is also occupied or not available, the positive potential applied thereto is directly switched-through from terminal No. 1 to terminal No. 2 of this circuit via front contact $B_1$ or the contact of the break jack $BJ_1$ so that the positive potential supplied via the front contact $St_3$ of the preferred selector switch circuit is directly transmitted to the first free circuit in the chain.

The sequence in which the circuits are connected in the chain is the same as the sequence in which the home positions of their selector switch circuits occur, in which the next circuit of the chain with respect to an arbitrary particular circuit, always has the home position of the selector switch preceding to the home position of the junction of the circuit under consideration.

From the above-mentioned description it will be clear that in case one or more selector switch circuits of the chain is or are found and proves or prove to be occupied or not available, the first free circuit of all free selector switch circuits which is then seized is that in which the selector switch has its home position nearest to the terminal of the calling junction in the direction of movement of the selector switch.

The above considered series circuit is also utilised so that, if the first free selector switch circuit fails to function normally, a second selector switch circuit is set into operation with some delay to hunt for the calling junction.

To this end a condenser of ½ mf. is normally charged to −48 volt potential via back contact $St_2$ and 500 ohm resistance. When a starting relay *Str* operates, the negative potential is switched-off by opening back contact $St_2$ whilst the condenser is connected to the +60 volt potential source via front contact $St_1$, 1 megohm resistance and front contact $St_3$, so that the potential at the electrode of the condenser connected with front contact $St_1$, gradually changes from a negative to a positive value.

The terminal No. 2 of the selector switch circuit under consideration is connected to ground via back contact $B_2$ and 5 megohm resistance in the next selector switch circuit of the chain. As long as the charge of the condenser is negative the potential at the rectifier will be opposite to the forward current direction. As the potential at the condenser however becomes positive, current commences to flow in the forward direction, so that the following circuit is closed: +60 volt potential source, front contact $St_3$, 1 megohm resistance, rectifier, terminal No. 2 of the first selector switch circuit, terminal No. 1 of the next selector switch circuit, 600,000 ohm resistance, back contact of the break jack $BJ_2$, back contact $B_2$, 1 megohm resistance, control electrode of tube CC, in the next selector switch circuit.

Only after the potential at the condenser has a sufficient positive value to develop a potential at the control electrode of tube CC in the next selector switch circuit, which together with the negative potential at the cathode of this tube, is equal to or larger than the breakdown potential, can the tube fail, so that the selector switch of the next selector switch circuit is set into operation. With the values shown in the figure, the delay with which tube CC in the next selector switch circuit responds, is about 0.6 second. If the next selector switch circuit in the chain is already occupied, the positive potential supplied to it from the preceding selector switch circuit, is transmitted immediately to the next circuit in the chain via front contact $B_1$ or via front contact $BJ_1$. In this way the first free circuit in the chain is always caused to start with a certain delay, in case the preferred selector switch circuit fails to function normally or does not function normally within an average 0.6 second, and this is the circuit which has the home position of the selector switch of all free selector switch circuits nearest to the terminals of the calling junction in the direction of motion of the switches.

The rectifier in each link of the chain serves a double purpose. First of all it prevents the +60 volt potential being passed in the direction towards the next selector switch circuit as long as the condenser is negative with respect to ground.

A second function of the rectifier takes place in the preceding selector switch circuit viz. as a positive is prevented from reaching the control electrode of tube CC in this preceding circuit. It is attained hereby, that the switching-through in the chain from one selector switch circuit to the next one only takes place in the desired direction.

For the sake of completeness it may be noted that a prior circuit arrangement is known from the U. S. patent application 283,735, filed June 11, 1939, in which an analogous chain circuit arrangement is used in which however relay contacts of the different starting relays are included in series with the chain. This chain circuit however does not include rectifiers for attaining the above described effect.

The invention is not limited to the circuit arrangement shown with the values indicated so that this shown circuit arrangement should not be considered in any way as limiting the scope of the invention.

I claim:

1. In an automatic telephone system having a plurality of groups of lines, a group of register controllers common to said lines a plurality of selector switches having banks of terminals to which said lines are respectively connected, said switches being selectively operative to connect a line to one of said registers in response to a calling condition of said line, said selector switches each having a different home position on the respective groups of terminals connected respectively to said line groups, circuit means connecting two corresponding terminals of each of said selector switches in a closed series circuit, and starting means connected to said circuit means operative in response to a call on any of said lines to start that free selector switch which is nearest to the terminals of the calling line in the switching direction.

2. In an automatic telephone system, the combination according to claim 1, and further comprising resistance elements between the terminals of each selector switch included in said closed series circuit, a rectifier element for each selector switch in said circuit, at least one pair of contacts shunting each of said combined resistance and rectifier elements when said contacts are closed, and relay means operative to close said contact when said selector switch is not available for operation.

3. In an automatic telephone system, the combination according to claim 2, and further comprising a condenser for each selector switch selectively connectable in shunt to said rectifying element in said series circuit, a source of biasing potential normally connected to said condenser and means operative in starting any of said selector switches to connect said condenser to said rectifying element and thereby bias said rectifier so as to prevent current flowing therethrough until said condenser is discharged, whereby a predetermined delay is produced before current can flow in said circuit to the next selector switch.

4. In an automatic telephone system, the combination according to claim 1, and further comprising means operative to prepare the starting circuit of a succeeding selector switch having a home position second nearest to a desired line terminal, if the selector switch nearest to said terminal is in use.

5. A selector switch starting circuit for automatic telephone systems comprising a plurality of lines, a plurality of selector switches having banks of terminals to which the lines are respectively connected each having a different home position on said terminal banks, circuit means connecting two corresponding terminals of each of said selector switches in a closed series circuit, a rectifier for each of said selector switches in said series circuit, means operative in response to a calling signal on a line for starting a selector switch whose home position is nearest to a called line terminal, means operative in the event that said last named selector switch is not available, in response to a predetermined time delay, for preparing a circuit through the rectifier of said unavailable selector switch for a next nearest selector switch, and means for preventing seizure of any selector switch already in use.

6. The selector switch starting circuit, as claimed in claim 5, wherein if said next nearest selector switch is also in use, said means for preparing the circuit is operative to continue the connection to a selector switch which is free and which occupies the most favorable home position with respect to the called line.

MARTINUS DEN HERTOG.

REFERENCES CITED

The following references are of record in the file of this patent:

UNITED STATES PATENTS

| Number | Name | Date |
|---|---|---|
| 1,271,337 | Lundell | July 2, 1918 |
| 1,291,959 | Lundell | Jan. 21, 1919 |
| 1,456,507 | Lundell | May 29, 1923 |
| 1,924,661 | Stehlik | Aug. 29, 1933 |